Figure 1:
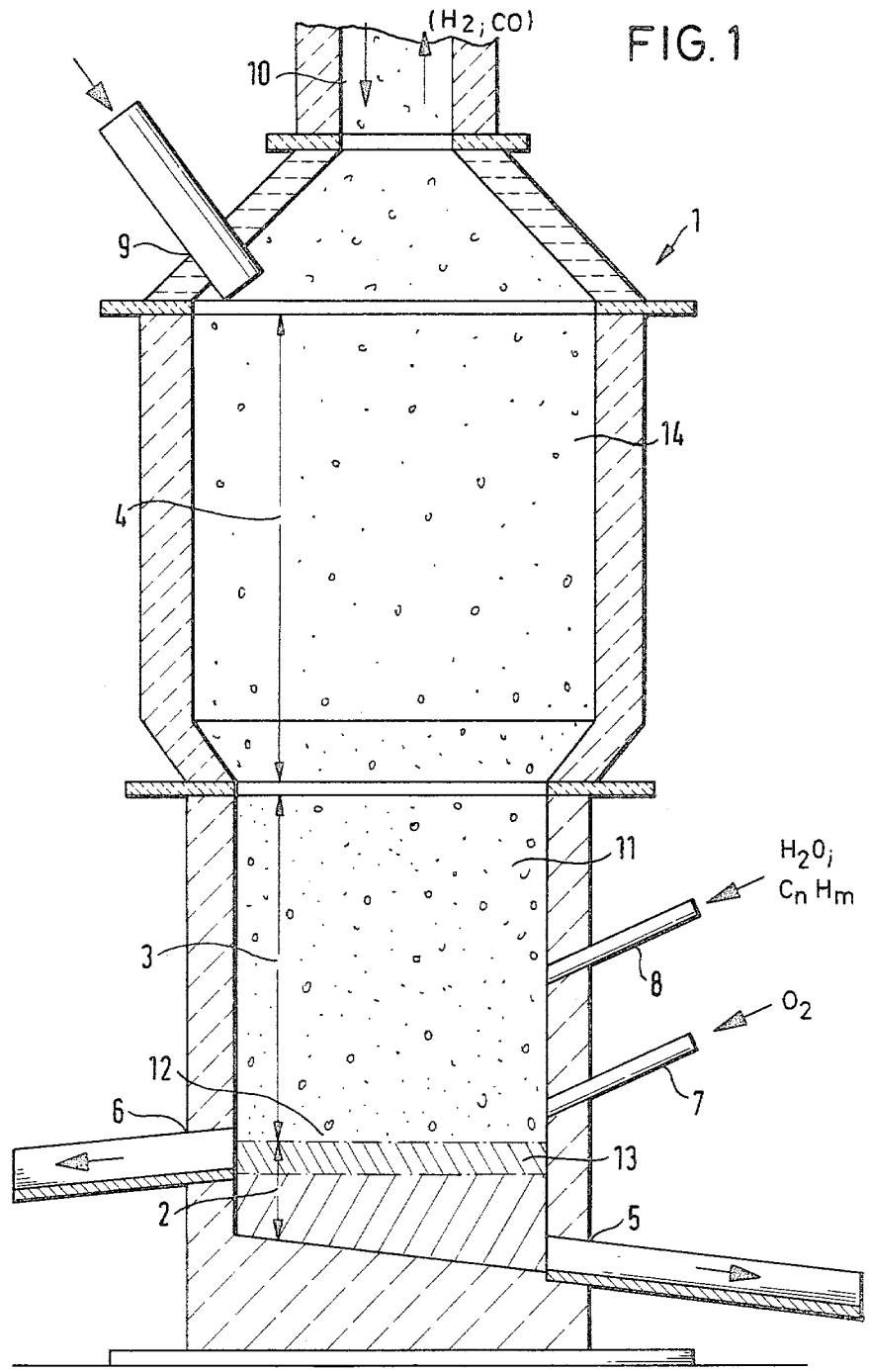

United States Patent

Weber et al.

[11] 4,317,677
[45] Mar. 2, 1982

[54] PROCESS FOR PRODUCING LIQUID CRUDE IRON AND REDUCTION GAS

[75] Inventors: Ralph Weber, São Paulo, Brazil; Emil Elsner, Baden-Baden, Fed. Rep. of Germany; Walter Maschlanka, Gaggenau, Fed. Rep. of Germany; Bernt Rollinger, Baden-Baden, Fed. Rep. of Germany; Gerhard Sanders, Baden-Baden, Fed. Rep. of Germany

[73] Assignee: Korf-Stahl AG., Baden-Baden, Fed. Rep. of Germany

[21] Appl. No.: 81,490

[22] Filed: Oct. 3, 1979

[30] Foreign Application Priority Data

Oct. 4, 1978 [DE] Fed. Rep. of Germany ....... 2843303

[51] Int. Cl.³ ............................................. C21B 11/00
[52] U.S. Cl. ......................................... 75/43; 75/26; 75/38
[58] Field of Search ................... 75/26, 38, 40, 43, 11

[56] References Cited

U.S. PATENT DOCUMENTS

| | | | |
|---|---|---|---|
| 2,321,310 | 6/1943 | Moore | 75/26 |
| 2,560,470 | 7/1951 | Ogorzaly | 75/26 |
| 2,742,352 | 4/1956 | Gilliland | 75/26 |
| 2,774,662 | 12/1956 | Graham et al. | 75/26 |
| 2,978,315 | 4/1961 | Schenck et al. | 75/26 |

*Primary Examiner*—M. J. Andrews

[57] ABSTRACT

A process for the production of molten crude iron and reduction gas is described wherein the molten iron and gas are formed in a smelting gasifier, to which is introduced at the upper portion thereof preheated sponge iron of particle size between 3 mm and 30 mm and coal to form a fluidized bed, and an oxygen-containing gas at the lower portion thereof, and controlling the ratio of oxygen-containing gas and coal to maintain a high temperature zone in the lower portion of the gasifier and a lower temperature zone in the upper portion thereof, the oxygen-containing gas being introduced substantially immediately above the resulting melt which is formed at the bottom of the gasifier.

25 Claims, 2 Drawing Figures

PROCESS FOR PRODUCING LIQUID CRUDE IRON AND REDUCTION GAS

DESCRIPTION

The present invention relates to a process as set forth in the classifying portion of claim 1.

Processes of this kind suffer from the problem on the one hand of producing the high temperature required for smelting the iron sponge in the smelting gasifier, and on the other hand producing a high-quality reduction gas, in an economical manner. Therefore, in the process known from Swiss patent specification No. 379 542, a carbon-bearing fuel undergoes combustion with an oxygen-bearing gas, in the smelting vessel or crucible, in such a way as to produce an oxidising atmosphere which ensures the temperature required for the smelting process, a temperature range of from 1595° to 1925° C. being specified. The gas which leaves the smelting vessel is subjected to an enrichment treatment in a separate reforming zone in which an excess of fuel is burnt with oxygen. Coal in powder or grain form is fed to the burners, and preferably industrial or commerical oxygen gas is used as the oxygen-rich gas. As an oxidising atmosphere obtains in the smelting vessel, in order to produce the required smelting temperature, coal is introduced into the smelting vessel separately or mixed with the feed of iron sponge, in order to protect the molten iron from re-oxidation and in order to complete the reduction operation. The additional carbon is absorbed by the liquid slag and the liquid metal, and, under the influence of the temperature obtaining in the smelting vessel, causes further reduction of iron oxide, while at the same time the molten iron is protected from re-oxidation.

A disadvantage with the known process is that only prepared coal in grain or powder form can be used for the burners, and the preparation of such coal gives rise to high costs and also that, until the iron sponge particles which are fed into the smelting vessel pass into the region of the smelt, such particles are first in an oxidising atmosphere in which small iron sponge particles are completely re-oxidised, so that the process appears to be suitable only for dealing with iron sponge in lump form, and a special reforming zone is required for enrichment of the reduction gas.

The invention seeks to provide a process of the general kind set out hereinbefore, wherein low-grade coal can be used without an expensive preparation treatment and a reducing atmosphere is substantially maintained in the smelting vessel at the high smelting temperature, so that it is possible to use iron sponge particles of smaller size, in addition to the larger particles. The invention seeks to make it possible to produce a high-grade reduction gas in the smelting vessel, which gas no longer requires any additional enrichment, while also seeking to permit optimum utilisation of the heat of the reactants.

This problem is solved by the process set forth in the characterising portion of claim 1. Advantageous embodiments and developments of the process are set forth in the subsidiary claims.

The invention is based on recognition of the fact that, by means of a hot fluidised bed of coal of sufficient height in the smelting vessel, it is not only possible to achieve a temperature of from 2000° to 2500° C. in a high-temperature zone in the lower region of the fluidised coal bed which is to be directly adjoining the smelt, so that iron sponge in lump form can also be very rapidly melted there, but that the fluidised coal bed also has a strong retarding action in respect of iron sponge in lump form, thereby ensuring that the iron sponge has a sufficient residence time in the fluidised bed, of the order of magnitude of some seconds, in order for the iron sponge to be heated by some hundreds of degrees centigrade in the heat exchange with the fluidised bed of coal, so that the iron sponge which has been greatly retarded and thus caught or captured in the region of the slag, can there be rapidly melted. Fine-grain iron sponge has such a long residence time in the fluidised bed of coal that the iron sponge is already melted therein, or is at least heated to the required extent. Particularly favourable conditions are produced if the iron sponge is introduced after it has already been pre-heated, that is to say, for example at a temperature of from about 500° to 900° C., preferably 500° to 850° C., and optionally about 750° C., in the form in which it is obtained directly from a reduction apparatus. For the purposes of producing a very high temperature in the hot-temperature zone, it seems essential for pre-heated oxygen to be injected into that zone, that is to say, oxygen which has been pre-heated for example to a temperature of from 350° to 450° C. An excessive amount of carbon particles from the adjacent region of the fluidised bed of coal is drawn into the flow of oxygen so as to produce a highly radiant flame which ensures good heat transfer to the iron sponge which is to be fused. On the other hand, the temperature of the fluidised coal bed is reduced by different endothermic reactions from the high-temperature zone in an upward direction, to a value of from 1000° to 1400° C., so that the reduction gas leaves the smelting vessel at approximately that temperature. The temperature and the composition of the reduction gas can also be controlled by injecting water vapour or hydrocarbons, approximately halfway up the fluidised bed of coal. The above-mentioned temperature conditions permit immediate coking of the coal added, with larger pieces of coal bursting so that, even when using ungraded coal with a grain size of about 12 mm, the fluidised bed formed is one in which the grain size of the particles of coke is substantially from 2 to 3 mm. If coke fines or breeze or brown or soft coal is used, it is necessary for the grain size to be so selected that the desired fluidised bed is produced. The mode of operation of the process permits complete cracking of heavy hydrocarbons and, if the height of the fluidised bed is sufficient at from 1.5 to 2.5 meters, the process ensures gas compositions in which the amount of CO and $H_2$ is more than 85%. Thus, an excellent reduction gas is produced without additional enrichment, and cheap coal can be used without an expensive preparation operation. Fine ore can also be added for the purposes of cooling the fluidised coal bed, the fine ore participating in the fluidisation action and being reduced and melted in the fluidised bed. If fine ores of nonferrous metals are added, the melt can be alloyed therewith.

The high-grade reduction gas produced can be used as reduction gas in a reduction apparatus such as a direct-reduction shaft furnace. However, it may also be fed to a blast furnace in order for the reduction gas to replace high-grade coke in the blast furnace process. Thus, a kilogram of coke may be replaced by about 3 to 4 $Nm^3 CO/H_2$ at a temperature of 1000° C. In this way, approximately up to 20% coke can be replaced by reduction gas. It will be appreciated that the reduction gas can also be used in other ways.

Figure 2:
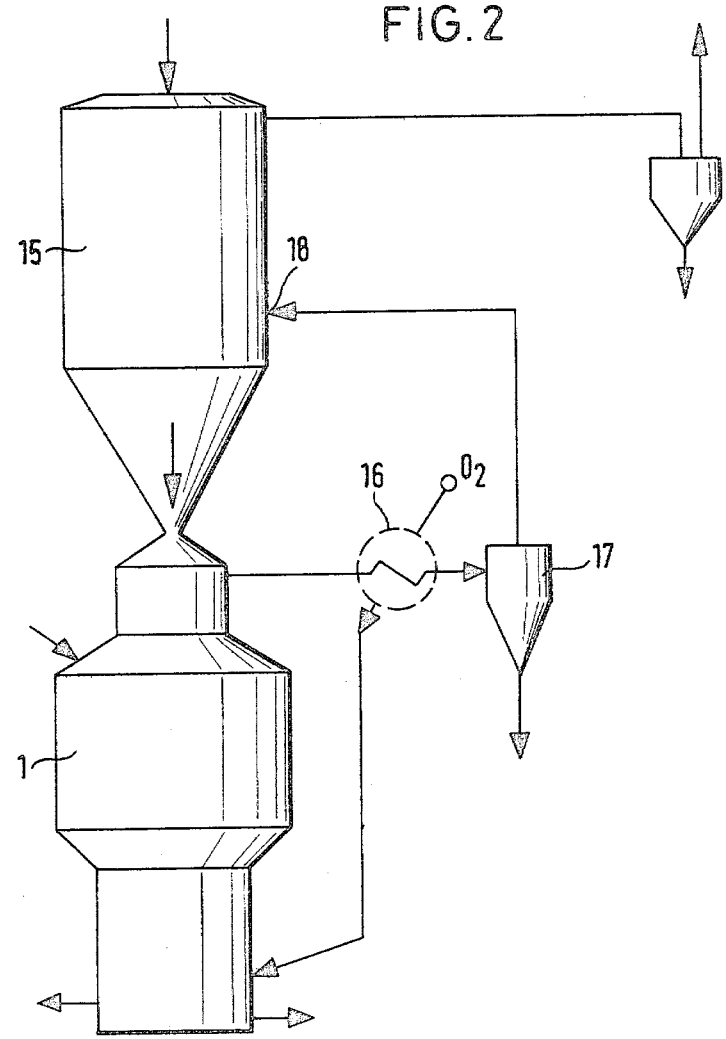

The invention is described in greater detail by means of two embodiments with reference to the accompanying drawings in which:

FIG. 1 shows a smelting gasifier for carrying out the process according to the invention, and FIG. 2 is a diagrammatic view of use of the FIG. 1 gasifier in a process for the production of crude iron from iron ore.

The smelting gasifier 1 which is shown in FIG. 1 as an example of apparatus of the invention has a lower portion 2 in which there are crude iron and slag, a middle portion 3 for a fluidised bed of coal, and an enlarged upper portion 4 which serves as a quieting or smoothing chamber. In a smelting gasifier whose dimensions were determined on the basis of practical experiments, the height of the middle portion 3 which is provided for the fluidised bed of coal is 2.5 meters, while the height of the upper portion 4 is up to 3 meters. The inside diameter in the middle and upper regions is about 3.2 meters. Openings 5 and 6 are provided for tapping off crude iron and slag, in the region of the lower portion 2, while pipes or nozzles 7, only one of which is illustrated, are provided for injecting an oxygen-bearing gas, being disposed at a level which is only slightly above the surface of the slag, while pipes or nozzles 8 are disposed approximately half way up the portion 3, for injecting water vapour or hydrocarbons. In this example, an opening 9 is provided for the feed of coal in the upper region of the gasifier, while an opening 10 is provided for introducing the iron sponge and for taking off the reduction gas.

By virtue of the process conditions which are described in greater detail hereinafter, a fluidised bed 11 of coal is formed in the middle portion 3 of the gasifier, with a high-temperature zone 12 in the lower region of the fluidised bed, being the region which adjoins the layer 13 of slag. At this point the temperatures obtaining are from 2000° to 2500° C. The temperatures of the fluidised bed decrease, as considered in an upward direction from the high-temperature zone, and reach values of from 1000° to 1400° C. in the upper region of the fluidised bed, which is adjacent to the smoothing or quieting chamber 14. Coal is preferably continuously introduced through the opening 9, and then passes by way of the chamber 14 into the fluidised bed. The coal used may be low-grade cheap coal which cannot be used for other processes. The coal can normally be used in a grain size of up to 12 mm, as the larger pieces of coal are abruptly degassed and burst, because of the high temperature. Therefore, the fluidised bed essentially contains coke particles which are from 2 to 3 mm in size. The coke particles assume the above-specified temperatures so that there is an excess of highly heated coke particles available for the oxygen which is injected by way of the nozzles 7 and which has been possibly pre-heated to temperatures of from 350° to 450° C., for combustion in the smelting gasifier, with result that a strongly radiant flame at the above-indicated temperature is produced in the high-temperature zone, thereby promoting melting of the iron sponge. In practical experiments, the oxygen is supplied at a speed of from 20 to 40 meters per second. With a view to the smallest possible amount of coal being carried away, it was possible for the speed of the carrier gas which rises in the fluidised bed to be kept below a value of 25 cm/second.

The iron sponge which is introduced by way of the opening 10 is markedly retarded in the fluidised bed, and is heated by some 100° C. by the time it passes into the high-temperature zone. The speed at that time has already fallen to such a considerable extent that generally the iron sponge no longer passes through the layer of slag, but instead the iron sponge floats on the slag and is thus rapidly melted in the region of very high temperatures on or within the layer of slag. Experiments have shown that, when the height of the fluidised bed 11 and the chamber 14 is 2 meters in each case, the diameter of the fluidised bed is 3.5 meters, the height of the layer of slag is 0.3 meters, the temperature in the high-temperature zone 12 is about 2200° C., the temperature in the upper region of the fluidised bed 11 is 1200° C., that is to say, the mean temperature in the fluidised bed is 1700° C., the mean diameter of the grains of coal which form the fluidised bed is 3 mm, the mean diameter of the particles of iron sponge is 10 mm, and the iron sponge particles are added at a temperature of 750° C., the iron sponge particles fall virtually unimpeded through the chamber 14 within less than one second, their temperature rising by only an insubstantial amount. Their speed of fall rises from 0 to about 6 meters/second. The iron sponge particles are retarded from about 6 meters/second to about 0.6 meters/second, that is to say, to a marked extent, in the hot fluidised bed 11, with the result that their residence time in the fluidised bed is increased to about 3 seconds. When this occurs, the coal fluidised bed was formed by continuously adding 1200 Kg coal (anthracite and Saar coal) per ton of pig iron and 690 Nm$^3$ oxygen (in cold condition) per ton of pig iron. The speed of the carrier gas rising in the fluidised bed was 0.32 m/s under standard conditions. The heat exchange with the fluidised bed causes the temperature of the particles of iron sponge to be raised from 750° C. to more than 1000° C. The particles of iron sponge impinge at the reduced speed on the layer of slag which is at a temperature of about 1700° C., and the iron sponge particles are melted on or in the layer of slag, within a very short period. The determining factors in respect of the iron sponge particle retardation effect and thus the desired residence time in the fluidised bed are the pressure head or dynamic pressure of the coal particles and the uplift. Pressure head or dynamic pressure and uplift and thus also the residence time are in turn dependent on the feed amounts of oxygen-bearing gas and coal, on the ratio between the amounts of oxygen-bearing gas and coal and the size of the coke particles in the fluidised bed of coal, which should not fall below a minimum value of 1 mm. In addition, determining factors in respect of the residence time are the height of the fluidised bed and the size of the iron sponge particles, which should not fall below 30 mm. The residence time also depends on the speed of fall of the iron sponge particles when they pass into the fluidised bed. In addition to the residence time, the heat exchange between the iron sponge particles and the fluidised bed and thus the degree of heating of the iron sponge particles in the fluidised bed also depends on the temperatures in the fluidised bed and on the size of the iron sponge particles. When the particles are more than 3 mm in size, heat radiation from the high-temperature zone has a substantial influence on the increase in temperature. Fine-grain particles of iron sponge, for example which are up to 3 mm in size, participate in the fluidisation effect until they are deposited into the bath, in the lower regions of the fluidised bed, when already in a liquefied condition.

Thus, fine-grain iron sponge can also be melted in the smelting gasifier.

The reduction gas produced in the gasifier 1 substantially comprises CO and $H_2$, and leaves the gasifier by way of the opening 10 at a temperature which approximately corresponds to the temperature in the upper region of the fluidised bed, that is to say, in the embodiment selected by way of example, at a temperature of about 1200° C. The desired composition and temperature of the reduction gas leaving the apparatus is obtained in dependence on the particular kind of coal or mixture of different coals used. Because of the importance of performance of the Boudouard reaction on the one hand and restriction by the ash softening point of the coals on the other hand, a temperature of about 1200° C. in the upper region of the fluidised bed should be sought. By injecting water vapour or hydrocarbons through the nozzles 8, the gas composition can be shifted towards higher proportions of $H_2$, while simultaneously reducing the temperature of the fluidised bed.

As already mentioned, the oxygen nozzle 7 is illustrated as representing a plurality of oxygen nozzles which are disposed along the periphery of the apparatus. The nozzles are preferably inclined obliquely downwardly towards the iron sponge which is to be melted. It may be advantageous for such nozzles to be disposed in two planes, at different angles of inclination. As the optimum setting of the nozzles varies with the height of the surface of slag, it seems advantageous for the nozzles to be adjustable in respect of their angle of inclination so that they can always be adjusted to the optimum angle of inclination during the smelting process. However, by continuously drawing off the crude iron and the slag, it is possible to provide that the surface of the slag is always kept approximately at the same level. Another possibility, particularly when starting up the process, is the provision of a coke structure or skeleton in which the downwardly moving particles of iron sponge can be retained and then melted in the high-temperature zone. The nozzles 7 do not need to be directed towards the centre of the fluidised bed. They can also be arranged eccentrically. This arrangement makes it possible, depending on the dimensions of the apparatus, for more uniform gasification to be achieved in the middle portion 3. If the portion 3 is of very large diameter, if it exceeds for example 4 meters, then it may be advantageous also to provide nozzles which inject from the centre, in addition to the nozzles which come in from the side.

FIG. 2 is a diagrammatic view showing use of the above-described apparatus in a combined plant for the production of liquid crude iron from oxidic iron ores. Disposed above the smelting gasifier 1 is a direct-reduction shaft furnace 15 which is supplied at position 18 with the reduction gas which is produced in the gasifier 1, after the reduction gas has given off a part of its perceptible heat to the oxygen which is to be pre-heated for the smelting gasifier, in a heat exchanger 16, and after the particles of coal which have been entrained with the reduction gas has been removed therefrom in a cyclone separator 17. The iron ore which is reduced in the reduction shaft furnace 15 passes into the smelting gasifier 1 in the form of hot iron sponge at a temperature of about 750° C., and is there melted down to form crude iron, as described above.

We claim:

1. A process for the production of molten crude iron and reduction gas in a smelting gasifier producing a melt of iron at the bottom thereof which comprises the steps of introducing hot sponge iron of a particle size of between about 3 mm and 30 mm at a temperature of from about 500° to 950° C., into the upper portion of the gasifier, further introducing into the upper portion of the gasifier coal to form a fluidized bed of coal particles having a depth of at least 1.5 m, still further introducing into a lower portion of said gasifier an oxygen-containing gas, adjusting the ratio of the oxygen-containing gas and coal fed to the gasifier to establish and maintain said coal in a fluidized state and to maintain a high temperature zone in the lower portion of said gasifier at about from 2000° to 2500° C., and reducing the temperature of said fluidized bed of coal at substantially the upper region thereof to a temperature of from about 1000° to 1400° C., retarding and heating said sponge iron particles introduced into the upper portion of the gasifier as they fall through the fluidized bed and smelting said particles in the high temperature zone to form a melt, tapping the melt of crude iron formed at the bottom of the gasifier and taking off the reduction gas from the upper portion of the gasifier, said oxygen-containing gas being introduced substantially immediately above said melt.

2. A process according to claim 1, wherein the high temperature zone is maintained at a temperature of from about 2200° to 2400° C., and the temperature of the fluidized bed decreases toward the upward region thereof to about 1100° C. to 1300° C.

3. A process according to claim 1, wherein the particle size of the coal is at least about 1 mm.

4. A process according to claim 1, wherein the particle size of the coal is at least about 2 mm.

5. A process according to claim 1, wherein the particle size of the coal is up to about 12 mm.

6. A process according to claim 1, wherein coke fines having a particle size of up to about 6 mm are introduced to the gasifier to form the fluidized bed.

7. A process according to claim 1 wherein the coal is selected from the group consisting of brown coal, and soft coal having a particle size of up to about 6 mm.

8. A process according to claim 1, wherein the maximum depth of the fluidized bed of coal is about 3.5 m.

9. A process according to claim 8, wherein the depth of the fluidized bed of coal is from about 2 to 2.5 m.

10. A process according to claim 1 wherein said oxygen-containing gas is preheated before introducing the same to the gasifier.

11. A process according to claim 10, wherein said oxygen-containing gas is preheated to a temperature of up to 450° C.

12. A process according to claim 10, wherein said oxygen-containing gas is preheated to a temperature of from about 200° to 800° C.

13. A process according to claim 10, wherein said oxygen-containing gas is introduced from the outer periphery of said gasifier and downwardly at an angle toward the interface between said fluidized bed of coal and said melt.

14. A process according to claim 10 wherein said oxygen-containing gas is introduced from substantially the center of said gasifier and downwardly at an angle toward the interface between said fluidized bed of coal and said melt.

15. A process according to claim 10, wherein said oxygen-containing gas is introduced at different levels and angles downwardly toward the interface between said fluidized bed of coal and said melt.

16. A process according to claim 15, wherein said angles are varied during the course of said process.

17. A process according to claim 1, wherein water vapor is introduced to the gasifier about mid-height of said fluidized bed of coal.

18. A process according to claim 1, wherein hydrocarbons are introduced to the gasifier about mid-height of said fluidized bed of coal.

19. A process according to claim 1, wherein the oxygen-containing gas is introduced at such a velocity and in such amount that the velocity of the ascending gas stream in the fluidized bed of coal is less than 0.4 m/sec but sufficient to maintain said bed in a fluidized state.

20. A process according to claim 1, wherein the pressure in the fluidized bed is from about 3 to 5 bars.

21. A process according to claim 1 wherein, the sponge iron is preheated to a temperature of from about 500° to 850° C. before it is introduced to the gasifier.

22. A process according to claim 1, wherein fine-grain ore is additionally introduced to the gasifier.

23. A process according to claim 1, wherein at least part of the reduction gas so produced is used to reduce iron ore to iron sponge which is introduced, while in a hot state, to said gasifier.

24. A process according to claim 1, wherein at least 80% of the preheated iron sponge has a particle size of from about 3 mm to 30 mm.

25. A process according to claim 1, wherein the iron sponge, coal and oxygen-bearing gas are continuously introduced into the gasifier, said iron sponge having a particle size of up to about 25 mm and being distributed uniformly on the upper surface of said fluidized bed of coal, the proportion of iron sponge particles of more than 3 mm being at least 80% and the fine proportion thereof less than 1 mm being at most 10% at least about 70% of said coal having a particle size from about 1 to 12 mm, and wherein the amounts of oxygen-bearing gas and coal and the ratio between same are adjusted to form a fluidized bed of coal sufficient to create a residence time in the fluidized bed of more than 0.7 seconds for iron sponge having a particle size of from about 3 to 25 mm.

* * * * *